US007242930B2

(12) United States Patent
Bogart et al.

(10) Patent No.: US 7,242,930 B2
(45) Date of Patent: ***Jul. 10, 2007

(54) SYSTEM AND METHOD FOR INCREASING TRANSMISSION CAPABILITY

(75) Inventors: David Bogart, Heathrow, FL (US); Christopher S. Erwin, Wesley Chapel, FL (US)

(73) Assignee: Cingular Wireless II, LLC, Atlanta, GA (US)

( * ) Notice: Subject to any disclaimer, the term of this patent is extended or adjusted under 35 U.S.C. 154(b) by 343 days.

This patent is subject to a terminal disclaimer.

(21) Appl. No.: 10/244,165

(22) Filed: Sep. 13, 2002

(65) Prior Publication Data

US 2004/0053608 A1    Mar. 18, 2004

(51) Int. Cl.
*H04Q 7/20*    (2006.01)
(52) U.S. Cl. ............... 455/424; 455/423; 455/561; 455/562.1; 455/115.1
(58) Field of Classification Search .............. 455/561, 455/562, 115.1, 67.11, 67.14, 522, 126, 452.1, 455/423–425, 562.1, 127.1, 63.1; 379/1.01, 379/9.04, 27.08
See application file for complete search history.

(56) References Cited

U.S. PATENT DOCUMENTS

| 5,521,904 | A | * | 5/1996 | Eriksson et al. ............ 370/249 |
| 5,574,981 | A | | 11/1996 | Ahonen |
| 5,854,986 | A | * | 12/1998 | Dorren et al. ........... 455/562.1 |
| 6,167,286 | A | | 12/2000 | Ward |
| 6,246,674 | B1 | * | 6/2001 | Feuerstein et al. .......... 370/334 |
| 6,470,193 | B1 | * | 10/2002 | Stolt ....................... 455/562.1 |
| 6,516,206 | B2 | | 2/2003 | Jantti |
| 6,640,111 | B1 | | 10/2003 | Shapira |
| 6,711,388 | B1 | | 3/2004 | Neitiniemi |
| 6,804,540 | B1 | * | 10/2004 | Shepherd et al. ........ 455/562.1 |
| 2002/0077154 | A1 | * | 6/2002 | Judson et al. ............... 455/562 |
| 2002/0103001 | A1 | | 8/2002 | Weissman |
| 2002/0119772 | A1 | * | 8/2002 | Yoshida ..................... 455/423 |
| 2002/0137547 | A1 | * | 9/2002 | Judson ....................... 455/562 |
| 2003/0073463 | A1 | | 4/2003 | Shapira |
| 2003/0139140 | A1 | | 7/2003 | Chen |
| 2003/0236089 | A1 | | 12/2003 | Beyme |
| 2004/0053583 | A1 | * | 3/2004 | Bogart et al. ............... 455/125 |
| 2004/0204107 | A1 | * | 10/2004 | Bogart et al. ............ 455/562.1 |

* cited by examiner

*Primary Examiner*—Duc M. Nguyen
*Assistant Examiner*—Anthony S. Addy
(74) *Attorney, Agent, or Firm*—Coulter C. Henry, Jr.; Parks Knowlton LLC; Paul E. Knowlton, Esq.

(57) ABSTRACT

A system for transmitting signals in a multi-sector wireless communications system. The system includes a first signal source associated with a first sector for generating a first signal, a first Auto Tune Combiner for processing the first signal, a second signal source associated with a second sector for generating a second signal, a second Auto Tune Combiner for processing the second signal and for combining the processed first signal with the processed second signal, and an antenna associated with the second sector for transmitting the combined processed first and second signals wherein the first Auto Tune Combiner is connected to the second Auto Tune Combiner with an extension cable.

17 Claims, 7 Drawing Sheets

SYSTEM AND METHOD FOR INCREASING TRANSMISSION CAPABILITY

DESCRIPTION OF THE INVENTION

1. Field of the Invention

The present invention relates generally to configuring equipment in a multi-sector wireless communications site to allow increased transmission capabilities in a single sector. More particularly, the present invention relates to configuring the radios and auto tune combiners so that transmission capability for one sector is borrowed from another sector in a multi-sector wireless communications site.

2. Background of the Invention

In a wireless communications system, a wireless carrier is often limited in the amount of space that it can use to install and maintain a wireless transmission site. For example, a wireless transmission site may be installed on the top of a building, on the top of a stadium, or in any other area in which space limitations are a problem. To address this problem, wireless equipment providers, such as Ericsson, provide self-contained cell sites (SCCS) which occupy a small footprint. An SCCS contains all of the equipment necessary to operate a wireless communications site, such as a cellular site. This equipment is typically contained in cabinets residing within the SCCS. These cabinets have fixed capacities and are generally not expandable.

In a typical SCCS, such as the Ericsson RBS884 system, only seven transmit radios per sector are typically included in a cabinet. In this manner, the transmission capability of an SCCS is limited to seven radios per sector or 21 total radios in a three-sector communications system. As is commonly known, each radio carries a signal on a particular channel. Therefore, in a prior art SCCS, only 21 channels may be transmitted at a particular site. In order to expand the channel capacity of a particular wireless communications site or the channel capacity of a single sector in a multi-sector wireless communication site, it is necessary to add additional SCCS's. In many cases, it is expensive or impractical to add an additional SCCS to a wireless communications system. In some cases, size constraints dictate that only a single SCCS may occupy a given area that comprises the site. In addition, the installation of a second SCCS requires permission from the landowner, additional time to design the site, and capital outlay to purchase the SCCS. Therefore, it is desirable to optimally utilize the capacity of a given SCCS.

FIG. 1 illustrates a prior art equipment configuration contained in a typical SCCS. In this configuration, eight different radios transmitting on eight different channels utilize a single antenna in a single sector. FIG. 1 depicts an equipment configuration in a typical SCCS for two sectors of a three-sector wireless communication system. The equipment configuration depicted on the top half of FIG. 1 is identical to that depicted on the bottom half of FIG. 1. Likewise, the equipment configuration for a third sector (not shown) is identical to the equipment configuration depicted for the other two sectors of FIG. 1.

The configuration of FIG. 1 is better understood with reference to FIG. 2. FIG. 2 illustrates a typical three-sector wireless communications system. In this three-sector system, three different antennas, one antenna per sector, transmit the signals produced by the radios depicted in FIG. 1. In this configuration, a simple tower 240 acts as an installation point for three different antennas, Antenna A 220, Antenna B 225, and Antenna C 230. Alternatively, these three antennas, 220, 225, and 230, may be attached to the top of a building or stadium. Sector A 205 occupies 120 degrees of transmit area. Antenna A 220, which is typically a unidirectional antenna, transmits in this 120 degrees of area. Likewise, Antenna B 225 operates in Sector B 210. Antenna B 225 transmits in the 120 degree area occupied by Sector B 210. Similarly, Antenna C 230 transmits in the 120 degree area occupied by Sector C 215. The three antennas, 220, 225, and 230, are typically unidirectional antennas that transmit in their designated sectors.

Returning now to FIG. 1, the equipment configuration depicted on the top half of FIG. 1 transmits in Sector A, while the equipment configuration depicted in the bottom half of FIG. 1 transmits on Sector B. Typically, a third equipment configuration identical to the two shown in FIG. 1 would be housed in an SCCS. This third equipment configuration (not shown) would transmit in Sector C.

In the prior art SCCS, a maximum of eight radios can operate in a given sector of a three-sector communications system. While the typical radio configuration comprises seven radios, the illustration of FIG. 1 depicts eight radios per sector. In Sector A 205, eight radios TRX1 102, TRX2 104, TRX3 106, TRX4 108, TRX5 110, TRX6 112, TRX7 114, and TRX8 116, are each connected to their respective Auto Tune Combiners. These eight Auto Tune Combiners, ATC1 118, ATC2 120, ATC3 122, ATC4 124, ATC5 126, ATC6 128, ATC7 130, and ATC8 132, are each connected to an Auto Tune Combiner Controller (ATCC) 134. In addition, the eight Auto Tune Combiners, 118–132, are sequentially connected to one another. The output of the eight Auto Tune Combiners, 118–132, is connected to a band pass filter TXBP 136. Multi-coupler unit 138 serves to interconnect band pass filter 136, radio frequency test loop device (RFTL) 140, and Antenna A 220. In this manner, multi-coupler unit (MCU) 138 serves to connect band pass filter 136 with RFTL 140. RFTL 140 is connected to multi-coupler 142. Multi-coupler 142 is then connected to TRX1 through TRX8, 102–116.

In a typical SCCS, the first through the eighth radios, 102–116, are each housed in a cabinet at the SCCS site. Each of these eight radios, as is commonly known, is usually a 30 Watt radio. Each of the eight different radios, 102–116, produces a radio signal at a different frequency or on a different channel. In a typical SCCS, the number of transmit radios is limited by the space available in the cabinet. In this case, as mentioned, the space constraints limit the transmit capability to eight radios per sector.

The set of eight Auto Tune Combiners, 118–132, processes the output of the eight radios, 102–116, to which they are connected. As is commonly known, the Auto Tune Combiners operate to combine the radio signals generated by the first through eighth radios, 102–116, to maximize power output to Antenna A 220. These Auto Tune Combiners provide automatic combining of a set number of transmit channels. Further, these Auto Tune Combiners typically monitor the change in operating frequency and power of their corresponding transmitters or radios and automatically tune each channel to the correct operating frequency. In a typical configuration, the eight Auto Tune Combiners, 118–132, are sequentially connected so that a single output signal is generated from the eight different signals generated by the eight radios, 102–116. In this manner, the Auto Tune Combiners, 118–132, combine the eight different signals produced by the eight radios, 102–116, into a single output signal for transmission on Antenna A 220.

Band pass filter 136 operates to filter the output of the Auto Tune Combiners, 118–132. Band pass filter 136, as is commonly known, ensures that the signal transmitted on Antenna A 220 falls within a specified frequency range. Typically, a wireless provider is allotted a specific bandwidth or spectrum on which to transmit. For example, a wireless carrier may be allotted 5 MHz of bandwidth. The band pass filter 136 then operates to filter any signals that fall outside this allotted 5 MHz bandwidth.

MCU 138 serves as a connection point for Antenna A 220, band pass filter 136, and RFTL 140. MCU 138 typically has a single connection port for an antenna and multiple connection ports for one or more RFTL devices. MCU 138 may provide a test port for a forward signal and a reflected signal.

RFTL 140 typically samples the forward signal and reflected signal from MCU 138. RFTL 140 performs tests on the sampled signals in order to ascertain whether the first through the eighth radios, 102–116, as well as Antenna A 220, are operating properly. Typically, RFTL 140 performs a voltage standing wave ratio (VSWR) measurement to determine if Antenna A 220 is operating properly. In addition, RFTL 140 typically performs tests on the sampled forward and reflected signals to determine if the first through the eighth radios, 102–116, are operating at a proper power level. RFTL 140 then produces a feedback signal, denoted by the dashed line, which controls the radios, 102–116.

Multi-coupler 142 simply serves as a connection between RFTL 140 and the first through the eighth radios, 102–116.

The same configuration is repeated for Sector B 225 and Sector C 230 (not shown). In these two sectors, eight radios are each interconnected to eight Auto Tune Combiners. The output of these Auto Tune Combiners is then connected to a band pass filter. A multi-coupler unit serves to interconnect a band pass filter, an antenna, and an RFTL device. The RFTL device, via a multi-coupler, is then connected to the radios.

In the example of FIG. 1, first through eighth radios of Sector B, 150–164, are interconnected to first through eighth Auto Tune Combiners of Sector B, 166–180. These eight radios and eight Auto Tune Combiners operate in the same manner as those previously described with reference to Sector A 205. The output of these eight Auto Tune Combiners, 166–180, is filtered by band pass filter 184. The filtered signal is then transmitted on Antenna B 225. RFTL 188 samples from multi-coupler unit 186 a forward and reflected signal. RFTL 188, after performing tests on the forward and reflected signals, sends a feedback signal to the eight radios, 150–164. In this manner, the configuration of Sector B 225 operates in the same manner as that of Sector A 205.

As can be seen from FIG. 1, the prior art SCCS, with its maximum of eight radios per sector, limits the amount of transmission capability on a given sector in a multi-sector wireless communications system. Due to equipment and footprint limitations inherent in an SCCS, the standard configuration depicted in FIG. 1 is difficult to alter. As discussed, in order to provide more transmission capability in a given sector, it is often necessary to add a second SCCS and a second set of antennas.

Increasingly, it is desirable to add additional transmission capability in a given sector without having to install another SCCS. For example, the load in a given wireless communication system may not be distributed evenly among the three sectors. With reference to FIG. 2, a stadium 235 may occupy a single sector, such as Sector B 225. During a sporting event, it would be desirable to increase the transmission capability on Antenna B 225 in Sector B 210 so as to service the stadium 235. The standard SCCS configuration, such as that of the Ericsson RBS884 system, does not allow for the configuration of radios to increase the transmission capability in a given sector.

Embodiments of the present invention are directed at overcoming one or more of the above issues.

SUMMARY OF THE INVENTION

In one aspect consistent with the general principles of the present invention, a method for transmitting signals in a multi-sector wireless communications system includes generating a first signal from a first signal source associated with a first sector, processing the first signal, generating a second signal from a second signal source associated with a second sector, processing the second signal, combining the processed first signal with the processed second signal, and transmitting the combined processed first and second signals in the second sector.

In a further aspect of the present invention, a method for transmitting signals in a multi-sector wireless communications system includes generating a first signal from a first signal source associated with a first sector, processing the first signal, transmitting the processed first signal on a first antenna associated with a first sector, generating a second signal from a second signal source associated with the first sector, processing the second signal, generating a third signal from a third signal source associated with a second sector, processing the third signal, combining the processed second and third signals, and transmitting the combined processed second and third signals on a second antenna associated with the second sector.

In another aspect of the present invention, a system for transmitting signals in a multi-sector wireless communications system includes a first signal source associated with a first sector for generating a first signal, a first Auto Tune Combiner for processing the first signal, a second signal source associated with a second sector for generating a second signal, a second Auto Tune Combiner for processing the second signal and for combining the processed first signal with the processed second signal, and an antenna associated with the second sector for transmitting the combined processed first and second signals wherein the first Auto Tune Combiner is connected to the second Auto Tune Combiner with an extension cable.

In yet another aspect of the present invention, a system for transmitting signals in a multi-sector wireless communications system includes a first signal source associated with a first sector for generating a first signal, a first Auto Tune Combiner for processing the first signal, a first antenna associated with the first sector for transmitting the processed first signal, a second signal source associated with the first sector for generating a second signal, a second Auto Tune Combiner for processing the second signal, a third signal source associated with a second sector for generating a third signal, a third Auto Tune Combiner for processing the third signal and for combining the processed second and third signals, and a second antenna associated with the second sector for transmitting the combined processed second and third signals wherein the second Auto Tune Combiner is connected to the third Auto Tune Combiner with an extension cable.

In another aspect of the present invention, a method for increasing the number of transmitting devices in a sector of a multi-sector wireless communications system includes connecting a first number of radio sources to an equal first number of Auto Tune Combiners associated with a first sector, connecting a second number of radio sources to an equal second number of Auto Tune Combiners associated with a second sector, and connecting the first number of Auto Tune Combiners in the first sector to the second number of Auto Tune Combiners in the second sector so that the first number of radio sources associated with the first sector and the second number of radio sources associated with the second sector transmit in the second sector.

In a further aspect of the present invention, a method for increasing the number of transmitting devices in a sector of a multi-sector wireless communications system includes connecting a first number of radio sources to an equal first number of Auto Tune Combiners associated with a first sector, connecting a second number of radio sources to an equal second number of Auto Tune Combiners associated with the first sector, connecting a third number of radio sources to an equal third number of Auto Tune Combiners associated with a second sector, and connecting the second number of Auto Tune Combiners in the first sector to the third number of Auto Tune Combiners in the second sector so that the second number of radio sources associated with the first sector and the third number of radio sources associated with the second sector transmit in the second sector.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Applicants have discovered that the standard configuration of an SCCS can be altered in order to allocate the transmission capability more heavily to a given sector. In this manner, a number of radios can be allocated in any manner over the three sectors of a multi-sector wireless communications system without the necessity of installing an additional SCCS. In a system consistent with the principles of the present invention, any number of radios associated with a given sector can be utilized in a different sector.

Consistent with the general principles of the present invention, a system for increasing the transmit capability of a single sector in a multi-sector communications system may include a first set of radios associated with a first sector, a second set of radios associated with the first sector, a first set of Auto Tune Combiners associated with the first sector, a second set of Auto Tune Combiners associated with the first sector, a first band pass filter associated with the first sector, a first multi-coupler unit associated with the first sector, an antenna associated with the first sector, a radio frequency test loop device associated with the first sector, a multi-coupler associated with the first sector, a third set of radios associated with a second sector, a third set of Auto Tune Combiners associated with the second sector, a band pass filter associated with the second sector, a multi-coupler unit associated with the second sector, an antenna associated with the second sector, a radio frequency test loop device associated with the second sector, and a multi-coupler associated with the second sector.

Figure 3:
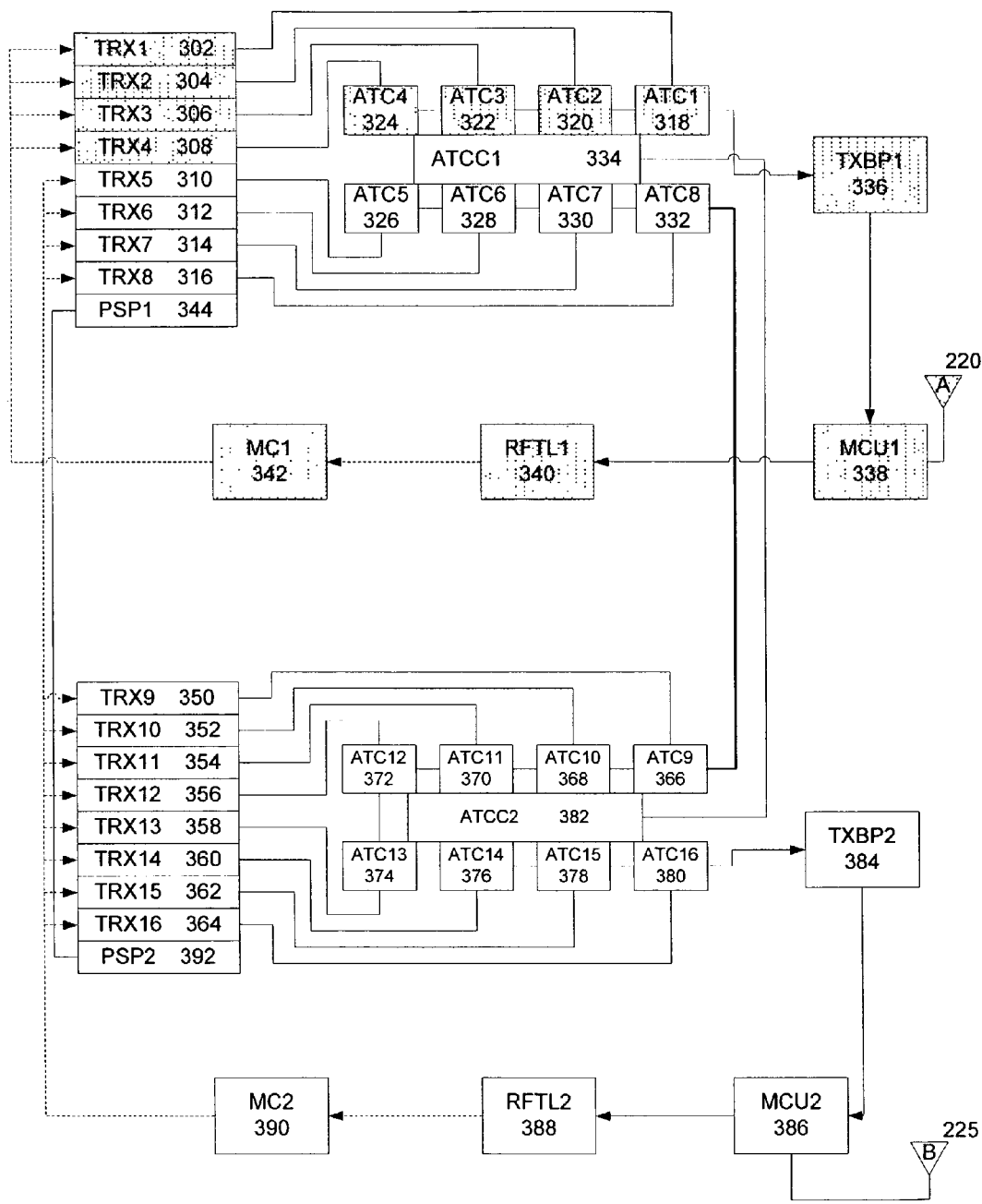
FIG. 3 is a block diagram of a wireless communications system consistent with the principles of the present invention.

As herein embodied and illustrated in FIG. 3, an exemplary embodiment of a system for increasing the transmit capability of a single sector in a multi-sector communications system includes: a first radio (TRX1) 302, a second radio (TRX2) 304, a third radio (TRX3) 306, a fourth radio (TRX4) 308, a fifth radio (TRX5) 310, a sixth radio (TRX6) 312, a seventh radio (TRX7) 314, an eighth radio (TRX8) 316, a first power splitter device (PSP1) 344, a first Auto Tune Combiner (ATC1) 318, a second Auto Tune Combiner (ATC2) 320, a third Auto Tune Combiner (ATC3) 322, a fourth Auto Tune Combiner (ATC4) 324, a fifth Auto Tune Combiner (ATC5) 326, a sixth Auto Tune Combiner (ATC6) 328, a seventh Auto Tune Combiner (ATC7) 330, an eighth Auto Tune Combiner (ATC8) 332, an Auto Tune Combiner Controller (ATCC1) 334, a first band pass filter 336, a first multi-coupler unit (MCU1) 338, a first antenna (Antenna A) 220, a first radio frequency test loop device (RFTL1) 340, a first multi-coupler 342, a ninth radio (TRX9) 350, a tenth radio (TRX10) 352, an eleventh radio (TRX11) 354, a twelfth radio (TRX12) 356, a thirteenth radio (TRX13) 358, a fourteenth radio (TRX14) 360, a fifteenth radio (TRX15) 362, a sixteenth radio (TRX16) 364, a second power splitter device (PSP2) 392, a ninth Auto Tune Combiner (ATC9) 366, a tenth Auto Tune Combiner (ATC10) 368, a eleventh Auto Tune Combiner (ATC11) 370, a twelfth Auto Tune Combiner (ATC12) 372, a thirteenth Auto Tune Combiner (ATC13) 374, a fourteenth Auto Tune Combiner (ATC14) 376, a fifteenth Auto Tune Combiner (ATC15) 378, a sixteenth Auto Tune Combiner (ATC16) 380, a second Auto Tune Combiner Controller (ATCC2) 382, a second band pass filter 384, a second multi-coupler unit (MCU2) 386, a second antenna (Antenna B) 225, a second radio frequency test loop device (RFTL2) 388, and second multi-coupler 390.

In the exemplary embodiment depicted in FIG. 3, TRX1 302 is connected to ATC1 318, TRX2 304 is connected to ATC2 320, TRX3 306 is connected to ATC3 322, TRX4 308 is connected ATC4 324, TRX5 310 is connected to ATC5 326, TRX6 312 is connected to ATC6 328, TRX7 314 is connected to ATC7 330, and TRX8 316 is connected to ATC8 332. PSP1 344 is connected to each of the first eight radios, 302–316. ATCC1 334 is connected to and controls each of the first eight Auto Tune Combiners, 318–332. In this configuration, ATC1 318, ATC2 320, ATC3 322, and ATC4 324 are all sequentially connected. Likewise, ATC5 326, ATC6 328, ATC7 330, and ATC8 332 are also sequentially connected.

In this exemplary embodiment, the first four Auto Tune Combiners, ATC1 318, ATC2 320, ATC3 322, and ATC4 324, are not connected to the second set of four Auto Tune Combiners, ATC5 326, ATC6 328, ATC7 330, and ATC8 332. The output of the first set of Auto Tune Combiners, ATC1 318, ATC2 320, ATC3 322, and ATC4 324, are connected to the first band pass filter 336. The first band pass filter 336 is connected to MCU1 338. MCU1 338 serves to interconnect first band pass filter 336, Antenna A 220, and RFTL1 340. RFTL1 340 is connected to MCU1 and first multi-coupler 342. First multi-coupler 342 is connected to the first through the fourth radios, 302–308.

In this exemplary configuration, TRX9 350 is connected to ATC9 366, TRX10 352 is connected to ATC10 368, TRX11 354 is connected to ATC11 370, TRX12 356 is connected to ATC12 372, TRX13 358 is connected to ATC13 374, TRX14 360 is connected to ATC14 376, TRX14 362 is connected to ATC15 378, and TRX16 364 is connected to ATC16 380. This second set of eight ATC's, 366–380, are all sequentially connected. In this manner, ATC9 366, ATC10 368, ATC11 370, ATC12 372, ATC13 374, ATC14 376, ATC15 378, and ATC16 380, are all sequentially connected. Further, ATCC2 382 is connected to each of these eight Auto Tune Combiners, 366–380. The output of these sequentially connected Auto Tune Combiners, 366–380, is connected to second band pass filter 384. Second band pass filter 384 is connected to MCU2 386. MCU2 386 serves to interconnect second band pass filter 384, Antenna B 225, and RFTL2 388. RFTL2 388 is connected to MCU2 386 and second multi-coupler 390. Second multi-coupler 390 is then connected to the fifth through eighth radios, 310–316, and ninth through sixteenth radios, 350–364.

First multi-coupler 342 interconnects RFTL1 340 to first through fourth radios, 302–308. Likewise, second multi-coupler 390 interconnects RFTL2 388 with the fifth through eighth radios, 310–316, as well as the ninth through sixteenth radios, 350–364.

Figure 1:
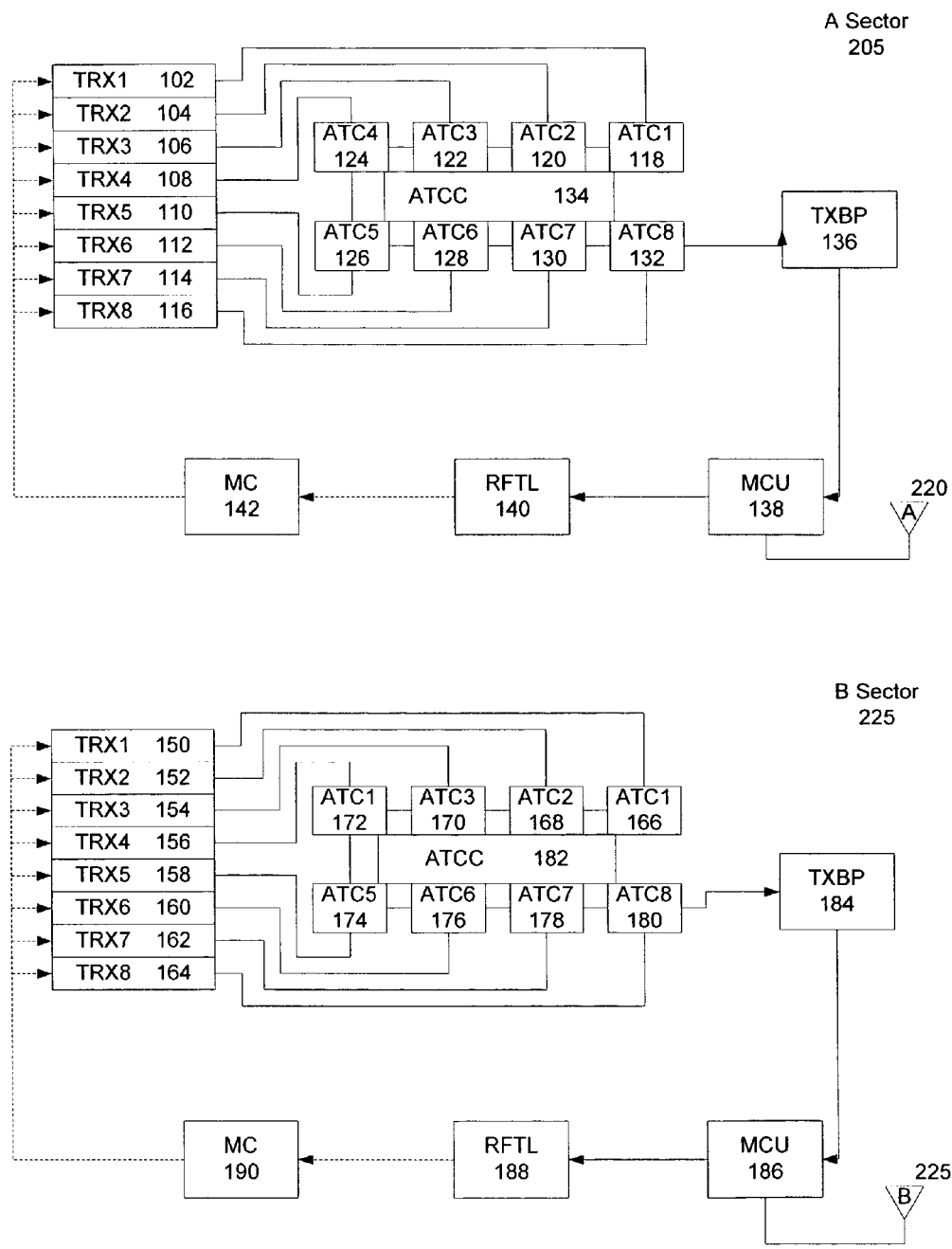
FIG. 1 is a block diagram of a typical self-contained cell site configuration of the prior art.

In addition, the exemplary embodiment of FIG. 3 contains connections between the components associated with Sector A 205 and the components associated with Sector B 210. As discussed in reference to FIG. 1, the prior art configuration of an SCCS comprises eight radios or transmitters per sector. In the exemplary embodiment of FIG. 3, however, four of the radios, 310–316, and four of the Auto Tune Combiners, 326–332, are connected to the devices associated with Sector B 210. In this manner, TRX5 310, TRX6 312, TRX6 314, TRX8 316, ATC5 326, ATC6 328, ATC7 330, and ATC8 332, while associated with Sector A 205, are connected to the components that operate in Sector B 210. As depicted in the exemplary embodiment of FIG. 3, ATC8 332 is connected to ATC9 366. In this manner, ATC5 326, ATC6 328, ATC7 330, and ATC8 332, which are all sequentially connected, are then connected to ATC9 366 through ATC16 380. Therefore, ATC5 326 through ATC16 380 are all sequentially connected. These twelve Auto Tune Combiners, 326–332, 366–380, then operate in conjunction with Antenna B 225 on Sector B 210. In addition, ATCC1 is connected to ATCC2. Likewise, the fifth through the eighth radios, TRX5 310, TRX6 312, TRX7 314, and TRX8 316, also operate in Sector B 210. Further, PSP1 344 is connected to PSP2 392. This connection between PSP1 344 and PSP2 392, in this embodiment, serves to connect the receive paths between fifth radio 310 through eighth radio 316 and ninth radio 350 through sixteenth radio 364. In this manner, a transmit path for transmission on Antenna B 225 is formed by the interconnection of the Auto Tune Combiners, ATC5 326 through ATC8 332 and ATC9 366 through ATC16 380. The receive path or reflected path from Antenna B 225 is implemented in this configuration with the connection between PSP1 344 and PSP2 392.

The connections between the components depicted in FIG. 3 are typically implemented with cables, such as coaxial cables. In other aspects of the invention, the interconnection between these devices may be achieved in any convenient manner. As is commonly known, the interconnection between these devices can be implemented with cables or by wireless means.

Figure 2:
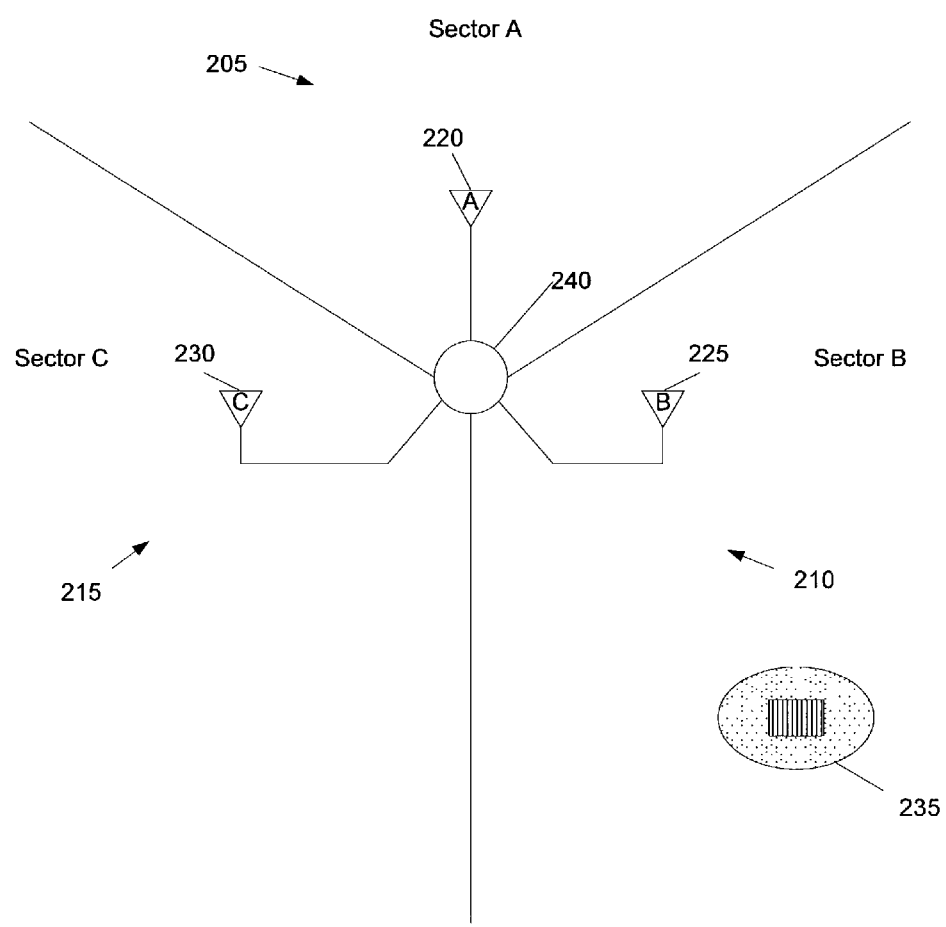
FIG. 2 is a diagram of a three-sector wireless communications system.

The configuration of FIG. 3 is better understood in conjunction with FIG. 2. Referring now to FIG. 2, an example of an antenna configuration associated with a multi-sector wireless communications system is depicted. As previously described, this wireless communications system is divided into three different sectors, Sector A 205, Sector B 210, and Sector C 215. Each of these three sectors divides the total transmit area into sectors of 120 degrees each. In this typical configuration, each sector has associated with it a single antenna. Antenna A 220 transmits in the 120 degree area occupied by Sector A 205. Likewise, Antenna B 225 transmits in the 120 degree area associated with Sector B 210. Antenna C 230 transmits in the 120degree area associated with Sector C 215. In addition, a tower 240 may be associated with the multi-sector wireless communications system. This tower 240 may serve as a mounting point for the three antennas, 220, 225, and 230. Alternatively, the three antennas may be mounted on the top of a building or stadium.

Referring again to FIG. 3, Antenna A 220 and Antenna B 225 are associated with Sector A 205 and Sector B 210, respectively. The principles of the present invention may be extended to a third sector, such as Sector C 215. In the embodiment depicted in FIG. 3, only two sectors are illustrated. Additional sectors and additional antennas may be added consistent with the principles of the present invention. In this manner, any number of radios or transmit devices associated with a first sector may be coupled to transmit with the radios associated with a second sector. For example, a third set of eight radios and eight Auto Tune Combiners may occupy an SCCS associated with Sector C 216. In this example, any number of the eight radios and eight Auto Tune Combiners associated with Sector C may be cabled together with the radios and Auto Tune Combiners associated with Sector B. Therefore, Sector B, in addition to gaining the transmit capabilities of the fifth through eighth radios of Sector A may gain additional transmit capabilities associated with Sector C. In this three-sector communications system example, the 24 total radios that may be-housed in a single SCCS can be split in any way among three different sectors. Likewise, the 24 Auto Tune Combiners which are associated with the 24 radios may also be split in any manner among the three different sectors. For example, two radios could transmit on Sector A, two radios could transmit on Sector C, and 20 radios could transmit on Sector B. Alternatively, all the radios could transmit on Sector B.

In the embodiment of FIG. 3, the sixteen radios, TRX1 302 through TRX8 316 and TRX9 350 through TRX16 364, are generally any type of signal source. Typically, these sixteen radios are 30 Watt radios that each produce a signal on a different frequency or on a different channel. In this embodiment, TRX1 302 produces a first signal on a first channel or frequency, and TRX2 304 produces a second signal on a second channel or frequency. Likewise, the remaining radios, 306–316 and 350–364, each produce signals on different frequencies or on different channels. Alternatively, these radios can be of any wattage and generate signals of any frequency. In alternate embodiments of the present invention, these radios can be any type of radio frequency or signal source. In a typical Ericsson RBS884 system, these sixteen radios are 30 Watt radios. Moreover, these radios, depending on the wireless communications system, may transmit in any band, e.g., 850 MHz, 900 MHz, 1800 MHz, or 1900 MHz.

The sixteen Auto Tune Combiners, ATC1 318–ATC8 332, and ATC9 366–ATC16 380, like the prior art Auto Tune Combiners, serve to process the output of the sixteen different radios. In general, an Auto Tune Combiner, such as ATC1 318, combines all of the frequencies from the various radio frequency sources to get maximum power output to the antenna. These Auto Tune Combiners provide automatic combining of a set number of transmit channels. Further, these Auto Tune Combiners typically monitor the change in operating frequency and power of their corresponding transmitters and automatically tune each channel to the correct operating frequency. In one embodiment of the present invention, the Auto Tune Combiners, as well as the other components in the system depicted in FIG. 3, may be obtained from Ericsson (such as in the Ericsson RBS884 system). In this case, ATC1 through ATC8, 318–332, are controlled by ATCC1 334. Likewise, ATC9 through ATC16, 366–380, are controlled by ATCC2 382. ATCC1 334 and ATCC2 382, as is commonly known, serve to control the function of the Auto Tune Combiners to which they are connected.

In this example, the band pass filters, 336 and 384, filter the output of the Auto Tune Combiners so that the signal transmitted on the antennas, 220 and 225, are within a designated bandwidth. Since a particular wireless communications system is allotted a particular spectrum on which to transmit, the band pass filters, 336 and 384, ensure that transmissions on the antennas, 220 and 225, occur within the allotted spectrum. In this manner, the band pass filters, as is known in the art, filter the output of the Auto Tune Combiners to which they are connected so that the signal transmitted on the antennas does not fall outside the bandwidth allocated to the wireless provider. For example, a wireless provider, in an e-band system, may be provided 5 MHz of bandwidth in which to transmit. The band pass filters, in this example, would then filter the output of their respective Auto Tune Combiners so as to ensure that the transmitted signal falls within the allocated 5 MHz bandwidth. The two band pass filters each function to filter out any signals that fall outside of the specified 5 MHz bandwidth. The operation of band pass filters is known to those skilled in the art, and band pass filters are easily obtainable from any number of manufacturers.

In the exemplary embodiment of FIG. 3, MCU1 338 and MCU2 386 each have a connection port for their respective antennas, Antenna A 220 and Antenna B 225. Likewise, MCU1 338 and MCU2 386 have test ports by which RFTL1 340 and RFTL2 388 sample a forward signal and a reflected signal. In one typical configuration, MCU1 338 and MCU2 386 each have two forward signal test ports and two reflected signal test ports. In this manner, two different radio frequency test loop devices may be connected to a single multi-coupler unit, such as MCU1 338 or MCU2 386.

The antennas of the embodiment of FIG. 3, Antenna A 220 and Antenna B 225, are typically unidirectional antennas, but may be antennas of any type. In the embodiments of FIGS. 2 and 3, the three antennas depicted are directional antennas which each transmit in their respective sectors. For example, Antenna A 220 transmits in Sector A 205. In this case, Antenna A 220 is a unidirectional antenna that transmits in the 120 degree area comprising Sector A 205. In this configuration, Antenna B 225 and Antenna C 230 are also unidirectional antennas that transmit in the 120 degree areas occupying Sector B 210 and Sector C 215, respectively. While unidirectional antennas are depicted in this embodiment of the present invention, other embodiments of the present invention may employ any type of antenna. For example, a wireless communications system may be divided into any number of sectors, each with associated antennas. In the case of a multi-sector communications system, the antennas in a particular sector are typically configured to transmit only in that sector. Alternatively, an omni-directional antenna may be used which transmits over the entire 360 degree area. The operation of these antennas is commonly known, and these antennas can be obtained from any number of wireless equipment providers, such as Ericsson.

RFTL1 340 and RFTL2 388 sample both the forward and reflected signals from MCU1 338 and MCU2 386, respectively. In this case, RFTL1 340 samples the forward path for the signal that is actually transmitted on Antenna A 220 through the forward port of MCU1 338 (not shown). In a similar fashion, RFTL1 340 samples the reflected path from the reflected port of MCU1 338 (not shown). As noted in reference to FIG. 1, RFTL1 340 and RFTL2 388 each serve to verify that the radios to which they are connected are operating at the proper power. Likewise, RFTL1 340 and RFTL2 388 also verify that Antenna A 220 and Antenna B 225 are operating properly. RFTL1 340 and RFTL2 388 each send feedback signals through first multi-coupler 342 and second multi-coupler 390 to their respective radios. The feedback signal generated by RFTL1 340 and RFTL2 388 is indicated by the dashed lines. In the configuration of FIG. 3, RFTL1 340 operates to control first through fourth radios, 302–308. Likewise, RFTL2 388 serves to control the fifth through the eighth radios, 310–316, as well as the ninth through the sixteenth radios, 305–316. In another aspect of the present invention, RFTL1 340 and RFTL2 388 perform voltage standing wave ratio (VSWR) measurements to ensure that the wireless communications system is operating properly.

In operation, the sixteen radios, 302–316 and 350–364, each generate a radio signal on different frequencies or on different channels. For example, TRX1 302 generates a first signal at a first frequency or on a first channel, while TRX2 304 generates a signal that is carried-on a second frequency or on a second channel. Likewise, the remaining radios each generate signals at specific frequencies or on specific channels. In general, the sixteen radios depicted in FIG. 3 each generate a signal at a different frequency or on a different channel. In alternate embodiments of the present invention, however, the first through fourth radios may generate signals at four different frequencies for transmission in Sector A 205. The fifth through eighth radios, 310–316, as well as the ninth through sixteenth radios, 350–364, may each generate signals at different frequencies or on different channels for transmission is Sector B 210. While the radios that transmit on a particular sector do not generate signals at the same frequency or on the same channel, the radios that transmit on different sectors may generate signals that are on the same frequency or channel. For example, TRX4 308 may generate a radio signal at a specific frequency or on a specific channel, while TRX15 362 generates a signal that is at the same frequency or on the same channel. This is permissible because TRX4 308 eventually transmits on Antenna A 220 associated with Sector A 205 while TRX5 310 eventually transmits on Antenna B 225 associated with Sector B 210.

The signals generated by each of the sixteen radios are then fed into their respective Auto Tune Combiners. For example, the signal generated by TRX6 312 is processed by ATC6 328. In this configuration, the first four Auto Tune Combiners, ATC1 318, ATC2 320, ATC3 322, and ATC4 324, are all sequentially connected. In this manner, the four signals generated by the first four radios, 302–308, while processed by their connected Auto Tune Combiners, 318–324, are all combined into a single output that is filtered by first band pass filter 336. In this manner, the first four Auto Tune Combiners, 318–324, combine the four different signals generated by the first four radios, 302–308, into a single output signal. In a similar manner, the fifth through the eighth radios, 310–316, as well as the ninth through the sixteenth radios, 350–364, each have their signals processed by the Auto Tune Combiners to which they are connected. For example, the signal generated by TRX7 314 is processed by ATC7 330. Since the fifth through the eighth Auto Tune Combiners, 326–332, and the ninth through the sixteenth Auto Tune Combiners, 366–380, are all sequentially connected, these twelve Auto Tune Combiners process twelve different signals and then combine them into a single output. In this manner, the twelve different signals generated by the fifth through the eighth radios, 310–316, and the ninth through the sixteenth radios, 350–364, are processed by their respective Auto Tune Combiners and then combined into a single output signal which is filtered by second band pass filter 384.

The output of the first four Auto Tune Combiners, 318–324, is then filtered by first band pass filter 336. In this manner, the output of the first four Auto Tune Combiners, 318–324, is maintained within a pre-specified bandwidth. First band pass filter 336 ensures that the signal eventually transmitted on Antenna A 220 in Sector A 205 is within the allotted spectrum or bandwidth assigned to a particular wireless provider. The filtered signal is then transmitted on Antenna A 220 in Sector A 205.

Likewise, the second band pass filter 384 filters the output of the second set of Auto Tune Combiners, ATC5 through ATC8, 336–332, and ATC9 through-ATC16, 366–380. In this manner, the second band pass filter ensures that the output signal of the second set of Auto Tune Combiners falls within a pre-specified bandwidth or spectrum. Second band pass filter 384, like first band pass filter 336, filters any signals that fall outside the spectrum or bandwidth allotted to a particular wireless provider. The filtered signal is then transmitted on Antenna B 225 in Sector B 210.

RFTL1 340 samples the signal that is transmitted on Antenna A (the forward path), as well as the reflected path signal. RFTL1 340 performs various tests on the forward path signal and the reflected path signal to determine if the first through fourth radios, 302–308, are operating at a proper power. In addition, RFTL1 340 may perform other measurements, such as measurements to ascertain whether Antenna A 220 is operating properly. RFTL1 340, after performing these measurements and tests, generates a feedback signal that is returned to the first through fourth radios, 302–308. For example, RFTL1 340 may perform tests on the forward and reflected path signals to ascertain that one of the first four radios, 302–308, is operating at an improper power level. In such a case, RFTL1 340 sends a feedback signal via first multi-coupler 340 to the radio that is operating at an improper power level.

In a similar manner, RFTL2 388 samples a forward path signal and a reflected path signal from Antenna B 225. In the configuration of FIG. 3, RFTL2 388 essentially monitors the signals that are generated by the fifth through eighth radios, 310–316, as well as the ninth through sixteenth radios, 350–364. In this manner, RFTL2 388 samples the forward and reflected signals that are associated with Antenna B 225. RFTL2 388, like RFTL1 340, performs various tests on the sampled signals. As noted, one such test may be to verify that Antenna B 225 is operating properly. Likewise, another of these tests may be to ascertain whether any of the fifth through eighth radios, 310–316, or the ninth through sixteenth radios, 350–364, are operating at an improper power level. If one of the fifth through eighth radios, 310–316, or the ninth through sixteenth radios, 350–364, are operating at an improper power level, then RFTL2 388 sends a feedback signal via second multi-coupler 390 to the improperly operating radio. For example, TRX10 352 may be operating at a low power level. RFTL2 388, after sampling the forward and reflected signals associated with Antenna B 225 and performing tests on those signals, sends a feedback signal (depicted by the dashed line) to TRX10 352. This feedback signal, for example, may initiate an increase in the power level at which TRX10 352 operates.

The configuration depicted in FIG. 3 allows greater transmit capacity on a given sector. By interconnecting the sequentially connected Auto Tune Combiners of two different sectors (and their associated radios), the radios from a first sector may be utilized to transmit on a second sector. In the example of FIG. 3, the fifth through the eighth radios, 310–316, which are associated with Sector A, are interconnected via their Auto Tune Combiners, 336–332, so that the fifth through eighth radios, 310–316, transmit on Antenna B 225 associated with Sector B 210. On the transmit path, interconnecting the Auto Tune Combiners and the Auto Tune Combiner Controllers allows radios from one sector to transmit on an antenna associated with a second different sector. The connection between PSP1 344 and PSP2 392 allows the receive paths of fifth through eighth radios, 310–316, as well as ninth through sixteenth radios, 350–364, to be associated with Antenna B 225. Therefore, by connecting the Auto Tune Combiners, Auto Tune Combiner Controllers, and PSP cards, as depicted in FIG. 3, an SCCS can be configured so that the radios associated with one sector can be utilized on a second sector.

The configuration of FIG. 3 may be utilized in cases in which a given sector has a much higher demand than the remaining two sectors. For example, in a football stadium, the three antennas depicted in FIG. 2 may be mounted such that Antenna B 225 serves the football stadium 235. During a football game, the demand in the stadium 235 may significantly outweigh the demand seen in the other two sectors, Sector A 205 and Sector C 215. In such a case, it is desirable to have significantly greater transmit capability associated with Sector B. Therefore, the configuration depicted in FIG. 3 can be implemented so that the transmit capability of Sector B is greatly enhanced.

The principles of the present invention described with reference to FIG. 3 may also be implemented in a multi-sector communications system with multiple antennas per sector. For example, each of the three sectors depicted in FIG. 2 may contain two antennas. In such a case, each antenna typically has associated with it eight different radios. Therefore, two SCCS's may be necessary for a three-sector communications system with two antennas per sector. In such a case, the radios associated with a first sector may be used to increase the transmit capabilities on a second sector. Applying the principles of the present invention, the transmit capability of a given sector in a multi-sector communications system with multiple antennas per sector can be configured so that the transmit capability of a single sector is increased while decreasing the transmit capabilities of a second sector. Likewise, the transmit capabilities of a single antenna may be increased while decreasing the transmit capabilities of a second different antenna. While the embodiment of FIG. 3 depicts eight radios per antenna, any number of radios and Auto Tune Combiners per antenna may be implemented using the principles of the present invention.

Figure 4A:
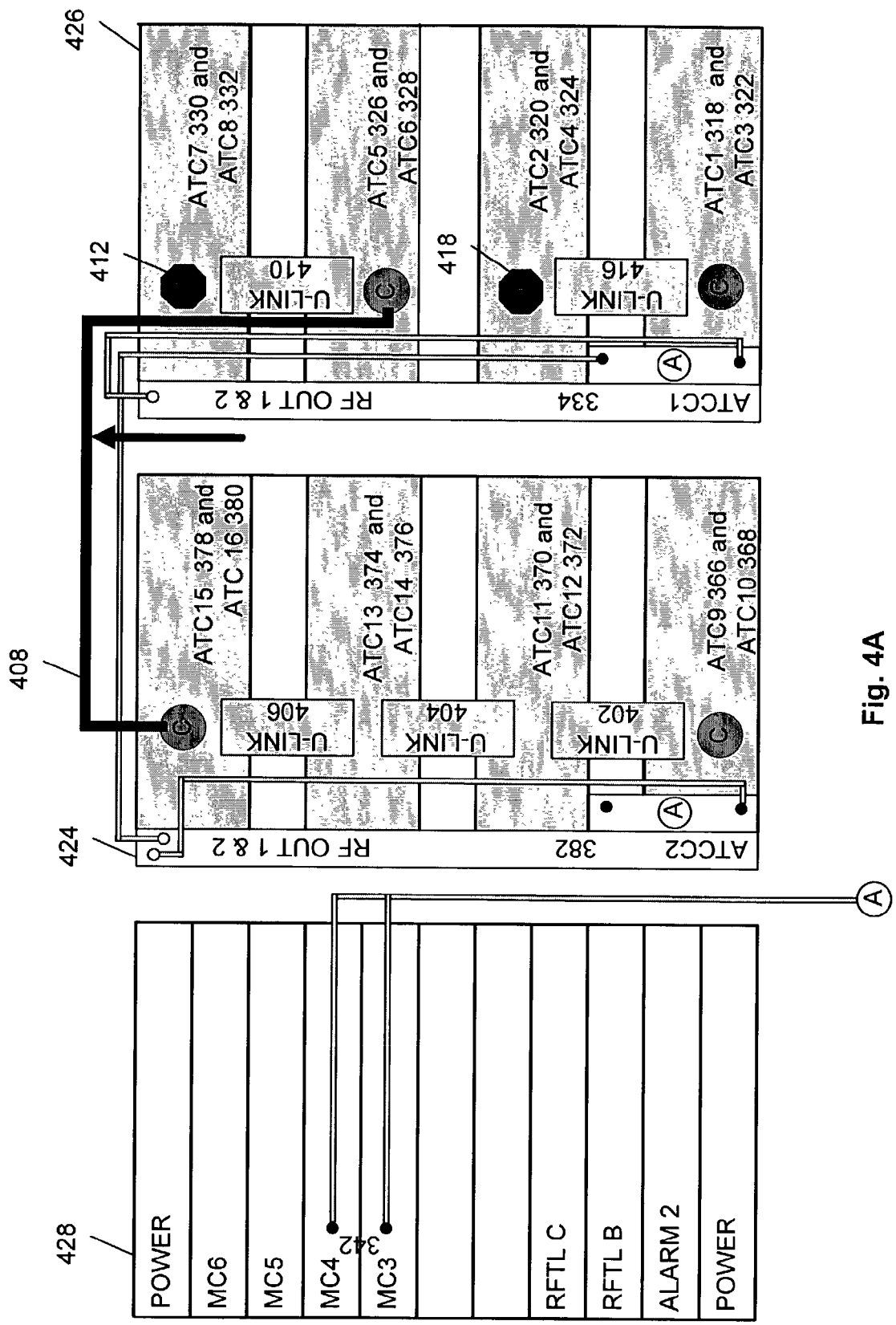
FIG. 4 is a wiring diagram of a wireless communications system consistent with the principles of the present invention.
Figure 4B:
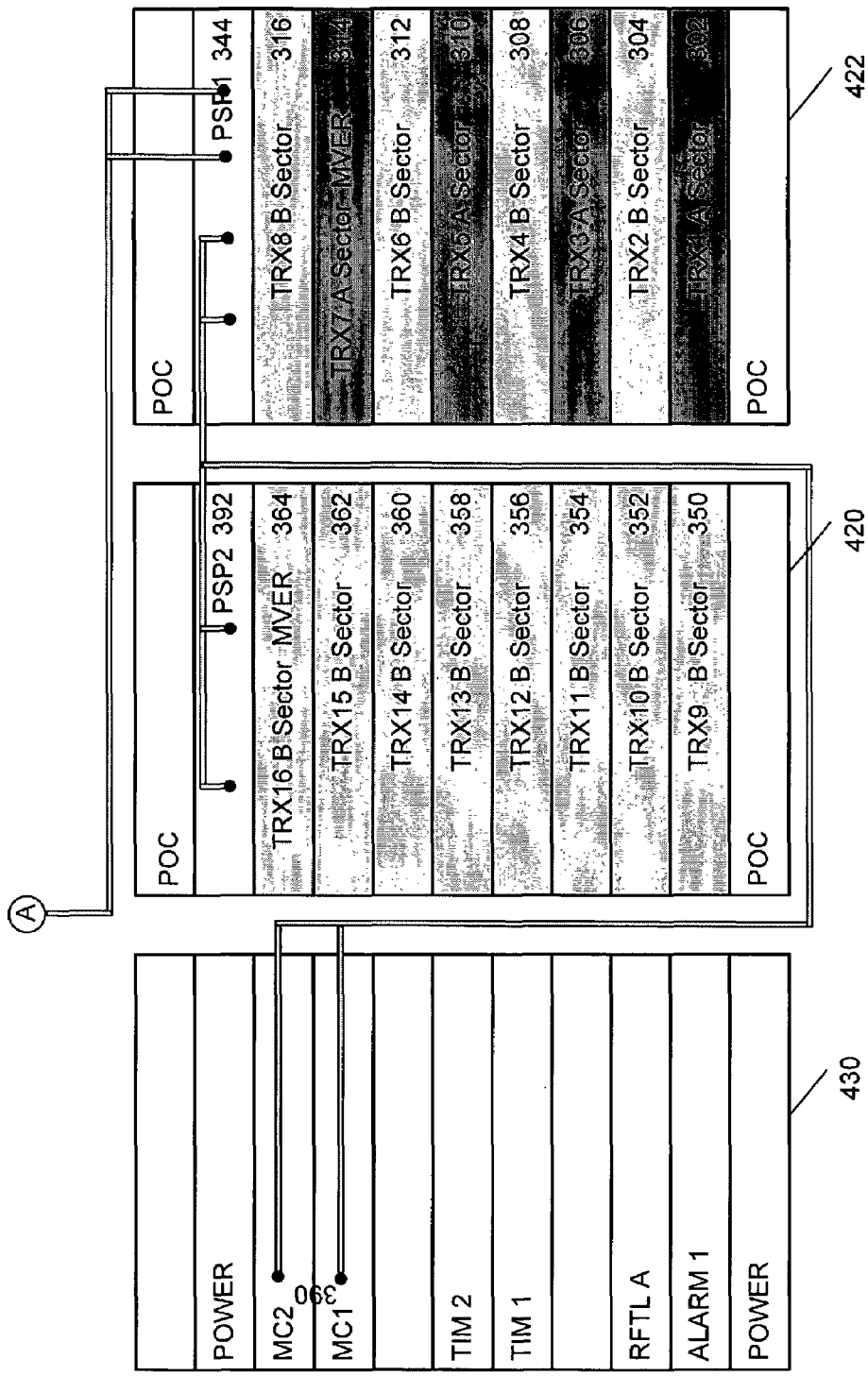

FIGS. 4A and 4B depict a wiring diagram for some of the components of the exemplary embodiment of FIG. 3. Some of the components of FIG. 3 are depicted in FIG. 4 much as they would appear contained in a cabinet contained in an SCCS. For example, the first through eighth radios, 302–316, as well as PSP1 344 are each contained within a cabinet 422. Likewise, the ninth through sixteenth radios, 350–364, as well as PSP2 392 are contained in cabinet 420. While other configurations of components and cabinets is well within the scope of the present invention, the exemplary embodiment of FIG. 4 depicts a typical configuration consistent with the Ericsson RBS884 system.

The connections of the components depicted in FIG. 4 are the same as the connections depicted in FIG. 3. Accordingly, only the additional connections necessary to implement the invention as depicted in FIG. 3 are described in detail. Multi-coupler 342 is interconnected to PSP2 392 and PSP1 344. Multi-coupler 390 is interconnected to PSP1 344. In addition, ATCC1 334 and ATCC2 382 are interconnected. The different sets of Auto Tune Combiners associated with two different sectors are connected with cable 408.

In the wiring diagram of FIG. 4, cabinet 420 contains the ninth through sixteenth radios, 350–364, as well as PSP2 392. Cabinet 422 contains the first through the eighth radios, 302–316, as well as PSP1 344. In this case, cabinet 422 is associated with Sector A 205, while cabinet 420 is associated with Sector B 210. As can be seen in FIG. 4, four of the eight radios contained in cabinet 422 transmit on Sector B, while the remaining four radios transmit on Sector A 205.

In the exemplary wiring diagram of FIG. 4, cabinet 424 contains eight Auto Tune Combiners. These Auto Tune Combiners are all sequentially connected with U-Links, 402, 404, and 406. Likewise, cabinet 426 contains a second set of Auto Tune Combiners. The first through fourth Auto Tune Combiners, 318, 320, 322, 324, are interconnected with U-Link 416, while the fifth through eighth Auto Tune Combiners, 326, 328, 330, 332, are connected with U-Link 410. In a standard SCCS configuration, cabinet 424 is associated with Sector B and cabinet 426 is associated with Sector A. In this case, however, the Auto Tune Combiners contained in cabinet 424 are interconnected with four of the Auto Tune Combiners contained in cabinet 426. Additionally, ATCC1 334 and ATCC2 382 are also interconnected.

Cabinet 428 contains multi-coupler 342, while cabinet 430 contains multi-coupler 390. In this configuration, cabinet 430 is associated with Sector B and cabinet 428 is associated with Sector A. As can be seen in FIG. 4, the multi-coupler associated with Sector B is connected to PSP2 392, as well as PSP1 344. In this manner, the ninth through the sixteenth radios, 350–364, as well as TRX2 304, TRX4 308, TRX6 312, and TRX8 316, are connected such that they transmit on Sector B. Multi-coupler 342, which is associated with Sector A, is connected to PSP1 344. In this manner, TRX1 302, TRX3 306, TRX5 310, and TRX7 314 transmit on Sector A.

Figure 5:
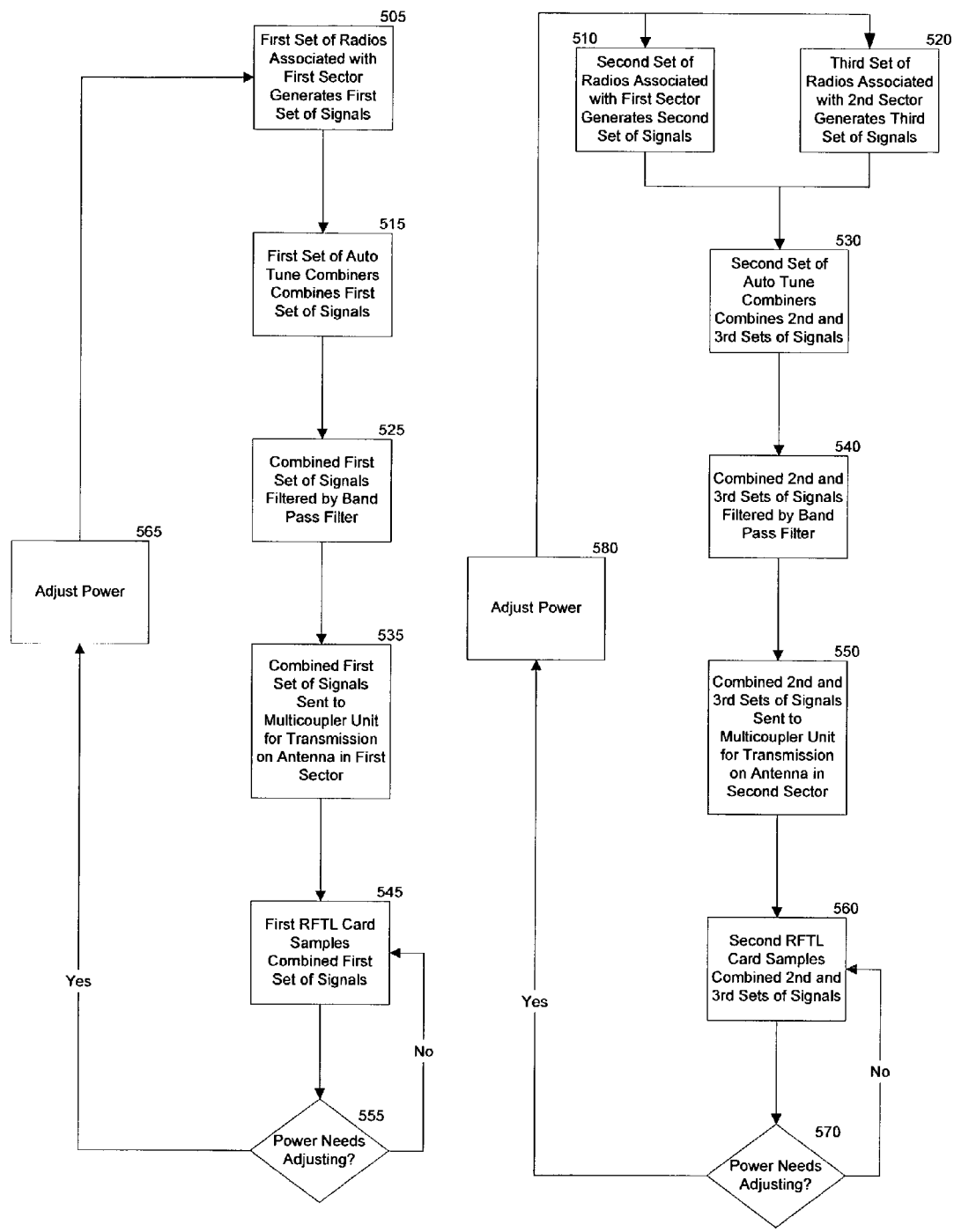
FIG. 5 is a flow chart of the operation of a wireless communications system consistent with the principles of the present invention.

FIG. 5 is flow chart depicting the operation of the exemplary embodiment depicted in FIG. 3. The two different flow charts comprising FIG. 5 may operate in parallel.

In step 505, a first set of radios associated with a first sector generates a first set of signals. Flow then proceeds to step 515 in which a first set of Auto Tune Combiners combines the first set of signals. In step 525, the combined first set of signals is filtered by a band pass filter. In step 535, the combined first set of signals is sent to a multi-coupler unit for transmission on an antenna in a first sector. First RFTL card, in step 545, samples the combined first set of signals. As previously described, the first RFTL card, after sampling the signals, performs various tests on the signals. One such test may be to determine whether one of the first set of radios is operating at an improper power level. This test is depicted by step 555, in which the RFTL card determines if the power of one of the radios needs adjusting. If the power does not need adjusting, then flow proceeds to step 545 in which the first RFTL card continues to sample the combined first set of signals. If the power does need adjusting, then flow proceeds to step 565, in which a feedback signal is sent to one of the first set of radios, thereby adjusting its power.

In step 510, a second set of radios associated with the first sector generates a second set of signals. As depicted in step 520, a third set of radios associated with a second sector generates a third set of signals. In step 530, a second set of Auto Tune Combiners combines the second and third sets of signals. In step 540, the combined second and third sets of signals is filtered by a band pass filter. Flow then proceeds to step 550, in which the combined second and third sets of signals are sent to a multi-coupler unit for transmission on an antenna in a second sector. In step 560, a second RFTL card samples the combined second and third sets of signals. As noted, an RFTL card may perform any number of different tests on the sampled signals. One such test is to ascertain whether one of the second or third sets of radios is operating at an improper power level. This test is depicted in step 570, in which the RFTL card determines whether one of the radios in the second or third set of radios needs its power adjusted. If the power of the radios does not need adjusting, then flow proceeds to step 560, in which the second RFTL card continues to sample the combined second and third sets of signals. If the power of one of the second or third sets of radios needs adjusting, then flow proceeds to step 580, in which the RFTL card sends a feedback signal to the improperly operating radio so that its power can be adjusted.

Figure 6:
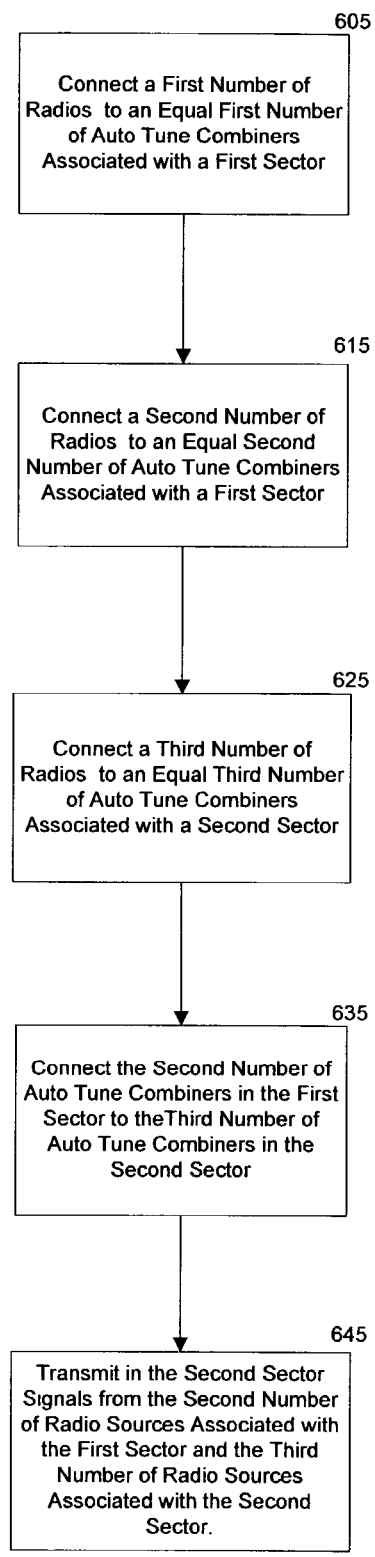
FIG. 6 is a flow chart depicting the assembly of a wireless communications system consistent with the principles of the present invention.

FIG. 6 is a flow chart depicting the connection of the components depicted in FIGS. 3 and 4. In step 605, a first number of radios is connected to an equal first number of Auto Tune Combiners associated with a first sector. In step 615, a second number of radios is connected to an equal second number of Auto Tune Combiners associated with the first sector. In step 625, a third number of radios is connected to an equal third number of Auto Tune Combiners associated with a second sector. In step 635, the second number of Auto Tune Combiners in the first sector is connected to the third number of Auto Tune Combiners in the second sector. In step 645, signals from the second number of radio sources associated with the first sector and the third number of radio sources associated with the second sector are transmitted in the second sector.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for transmitting signals in a multi-sector wireless communications system, the method comprising:

generating a first signal from a first signal source located in a first cabinet associated with a first sector; processing the first signal using a first Auto Tune Combiner located in the first cabinet;

generating a second signal from a second signal source located in a second cabinet associated with a second sector; processing the second signal using a second Auto Tune Combiner located in the second cabinet;

combining the processed first signal with the processed second signal by connecting the first and the second Auto Tune Combiners; and transmitting the combined processed first and second signals in the second sector, the first cabinet and the second cabinet being cabinets of a self-contained cell site, the second cabinet having a maximum signal source capacity that limits the number of signal sources that can transmit in the second sector, the connecting of the first and second Auto Tune Combiners overcoming the maximum signal source capacity of the second cabinet by transferring signal source capacity from the first sector to the second sector.

2. The method of claim 1, further comprising:
filtering the combined processed first and second signals.

3. The method of claim 1 further comprising:
sampling a signal transmitted on the antenna.

4. The method of claim 3, further comprising:
testing the signal transmitted on the antenna and adjusting the first and second signal sources.

5. The method of claim 1 wherein, the first Auto Tune Combiner is controlled by a first Auto Tune Combiner controller, and the second Auto Tune Combiner is controlled by a second Auto Tune Combiner controller.

6. The method of claim 5 wherein, the first Auto Tune Combiner controller is connected to the second Auto Tune Combiner controller.

7. A method for transmitting signals in a multi-sector wireless communications system, the method comprising:

generating a first signal from a first signal source located in a first cabinet associated with a first sector; processing the first signal using a first Auto Tune Combiner located in the first cabinet;

transmitting the processed first signal on a first antenna associated with a first sector;

generating a second signal from a second signal source located in the first cabinet associated with the first sector; processing the second signal using a second Auto Tune Combiner located in the first cabinet;

generating a third signal from a third signal source located in a second cabinet associated with a second sector; processing the third signal using a third Auto Tune Combiner located in the second cabinet;

combining the processed second and third signals by connecting the second and the third Auto Tune Combiners; and transmitting the combined processed second and third signals on a second antenna associated with the second sector, the first cabinet and the second cabinet being cabinets of a self-contained cell site, the second cabinet having a maximum signal source capacity limiting the number of signal sources that can transmit in the second sector, the connecting of the first and second Auto Tune Combiners overcoming the maximum signal source capacity of the second cabinet by transferring signal source capacity from the first sector to the second sector.

8. A system for transmitting signals in a multi-sector wireless communications system, the system comprising:

a first signal source located in a first cabinet associated with a first sector for generating a first signal;

a first Auto Tune Combiner located in the first cabinet for processing the first signal;

a second signal source located in a second cabinet associated with a second sector for generating a second signal;

a second Auto Tune Combiner located in the second cabinet for processing the second signal, the first and second Auto Tune Combiners being connected to combine the processed first and second signals; and an antenna associated with the second sector for transmitting the combined processed first and second signals, the first cabinet and the second cabinet being cabinets of a self-contained cell site, the second cabinet having a maximum signal source capacity limiting the number of signal sources that can transmit in the second sector, the connecting of the second and third Auto Tune Combiners overcoming the maximum signal source capacity of the second cabinet by transferring signal source capacity from the first sector to the second sector.

9. The system of claim 8, further comprising:
a band pass filter for filtering the combined processed first and second signals.

10. The system of claim 8, further comprising:
a radio frequency test loop device for sampling a signal transmitted on the antenna.

11. The system of claim 8, further comprising:
a first power splitter device located in the first cabinet connected to the first signal source; and
a second power splitter device located in the second cabinet connected to the second signal source, the first and second power splitter devices being connected to create a receive path between the first signal source and the second signal source.

12. The system of claim 8 further comprising:
a first Auto Tune Combiner controller for controlling the first Auto Tune Combiner; and
a second Auto Tune Combiner controller for controlling the second Auto Tune Combiner.

13. The system of claim 12 wherein, the first Auto Tune Combiner controller is connected to the second Auto Tune Combiner controller.

14. A system for transmitting signals in a multi-sector wireless communications system, the system comprising:

a first signal source located in a first cabinet associated with a first sector for generating a first signal;

a first Auto Tune Combiner located in the first cabinet for processing the first signal;

a first antenna associated with the first sector for transmitting the processed first signal;

a second signal source located in the first cabinet associated with the first sector for generating a second signal;

a second Auto Tune Combiner located in the first cabinet for processing the second signal;

a third signal source located in a second cabinet associated with a second sector for generating a third signal;

a third Auto Tune Combiner located in the second cabinet for processing the third signal, the second and third Auto Tune Combiners being connected to combine the processed second and third signals; and a second antenna associated with the second sector for transmitting the combined processed second and third signals, the first cabinet and the second cabinet being cabinets of a self-contained cell site, the second cabinet having a maximum signal source capacity that limits the number of signal sources that can transmit in the second sector, the connecting of the second and third Auto Tune Combiners overcoming the maximum signal source capacity of the second cabinet by transferring signal source capacity from the first sector to the second sector.

15. A method for increasing the number of transmitting devices in a sector of a multi-sector wireless communications system, the method comprising:

connecting a first number of radio sources located in a first cabinet to an equal first number of Auto Tune Combiners located in the first cabinet associated with a first sector, the first number of Auto Tune Combiners being controlled by a first Auto Tune Combiner Controller;

connecting a second number of radio sources located in a second cabinet to an equal second number of Auto Tune Combiners located in a second cabinet associated with a second sector, the second number of Auto Tune Combiners being controlled by a second Auto Tune Combiner Controller;

connecting the first number of Auto Tune Combiners in the first sector to the second number of Auto Tune Combiners in the second sector so that the first number of radio sources associated with the first sector and the second number of radio sources associated with the second sector transmit in the second sector; and connecting the first Auto Tune Combiner Controller to the second Auto Tune Combiner Controller, the first cabinet and the second cabinet being cabinets of a self-contained cell site, the second cabinet having a maximum signal source capacity that limits the number of signal sources that can transmit in the second sector, the connecting of the first number of Auto Tune Combiners in the first sector to the second number of Auto Tune Combiners in the second sector overcoming the maximum signal source capacity of the second cabinet by transferring signal source capacity from the first sector to the second sector.

16. The method of claim 15, wherein the connection between the second number of Auto Tune Combiners in the first sector and the third number of Auto Tune Combiners in the second sector is implemented with an extension cable.

17. A method for increasing the number of transmitting devices in a sector of a multi-sector wireless communications system, the method comprising:

connecting a first number of radio sources located in a first cabinet to an equal first number of Auto Tune Combiners located in the first cabinet associated with a first sector, the first number of Auto Tune Combiners being controlled by a first Auto Tune Combiner Controller;

connecting a second number of radio sources located in the first cabinet to an equal second number of Auto Tune Combiners located in the first cabinet associated with the first sector, the second number of Auto Tune Combiners being controlled by the first Auto Tune Combiner Controller;

connecting a third number of radio sources located in a second cabinet to an equal third number of Auto Tune Combiners located in the second cabinet associated with a second sector, the third number of Auto Tune Combiners being controlled by a second Auto Tune Combiner Controller;

connecting the second number of Auto Tune Combiners in the first sector to the third number of Auto Tune Combiners in the second sector so that the second number of radio sources associated with the first sector and the third number of radio sources associated with the second sector transmit in the second sector, and connecting the first Auto Tune Combiner Controller to the second Auto Tune Combiner Controller, the first cabinet and the second cabinet being cabinets of a self-contained cell site, the second cabinet having a maximum signal source capacity that limits the number of signal sources that can transmit in the second sector, the connecting of the second number of Auto Tune Combiners in the first sector to the third number of Auto Tune Combiners in the second sector overcoming the maximum signal source capacity of the second cabinet by transferring signal source capacity from the first sector to the second sector.

* * * * *